US008740119B2

(12) United States Patent
Anderson

(10) Patent No.: US 8,740,119 B2
(45) Date of Patent: Jun. 3, 2014

(54) PILL CRUSHER DEVICE AND METHOD

(75) Inventor: Sean D. Anderson, Powhatan, VA (US)

(73) Assignee: First Wave Products Group, LLC, Batavia, NY (US)

( * ) Notice: Subject to any disclaimer, the term of this patent is extended or adjusted under 35 U.S.C. 154(b) by 546 days.

(21) Appl. No.: 13/321,755

(22) PCT Filed: Feb. 9, 2010

(86) PCT No.: PCT/US2010/023587

§ 371 (c)(1), (2), (4) Date: Jan. 27, 2012

(87) PCT Pub. No.: WO2010/093609

PCT Pub. Date: Aug. 19, 2010

(65) Prior Publication Data

US 2012/0160946 A1 Jun. 28, 2012

Related U.S. Application Data

(60) Provisional application No. 61/207,298, filed on Feb. 10, 2009.

(51) Int. Cl.
*A47J 42/00* (2006.01)

(52) U.S. Cl.
USPC ..................... 241/169.2; 241/169; 241/169.1; 241/DIG. 27; 241/36; 241/270

(58) Field of Classification Search
CPC ........... A47J 42/34; A47J 42/04; A47J 42/46; A61J 7/0007; B26D 3/26; B02C 17/22; B02C 1/14; B02C 1/00; A61M 5/3129
USPC ....... 241/169, 169.1, 169.2, DIG. 27, 36, 270
See application file for complete search history.

(56) References Cited

U.S. PATENT DOCUMENTS

| | | | | |
|---|---|---|---|---|
| 4,366,930 | A * | 1/1983 | Trombetti, Jr. | 241/169 |
| 4,765,549 | A * | 8/1988 | Sherman | 241/169 |
| 5,067,666 | A * | 11/1991 | Sussman | 241/36 |
| 6,059,209 | A * | 5/2000 | Barson | 241/168 |
| 6,357,679 | B1 * | 3/2002 | Radke | 241/30 |
| 6,508,424 | B1 * | 1/2003 | Marshall | 241/169.1 |
| 7,427,041 | B2 * | 9/2008 | Hall et al. | 241/169.2 |
| 7,543,770 | B2 * | 6/2009 | Peron et al. | 241/169 |

* cited by examiner

*Primary Examiner* — Faye Francis
*Assistant Examiner* — Onekki Jolly
(74) *Attorney, Agent, or Firm* — Woods Oviatt Gilman LLP; Katherine H. McGuire, Esq.

(57) ABSTRACT

A pill crushing apparatus for use with first and second nestable cups includes a first stage of operation wherein a first cup holder is moved linearly toward a second cup mounting surface holding a second cup and a second stage of operation wherein the first cup holder rotates relative to the rotationally fixed second cup. During the first stage of operation, the pills first may begin to crush against the linear load being applied thereto, and thereafter grind into a fine powder due to the rotational force of the first cup against the second cup.

4 Claims, 6 Drawing Sheets

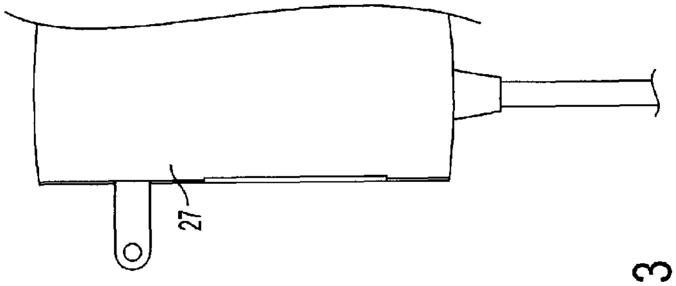
FIG. 3
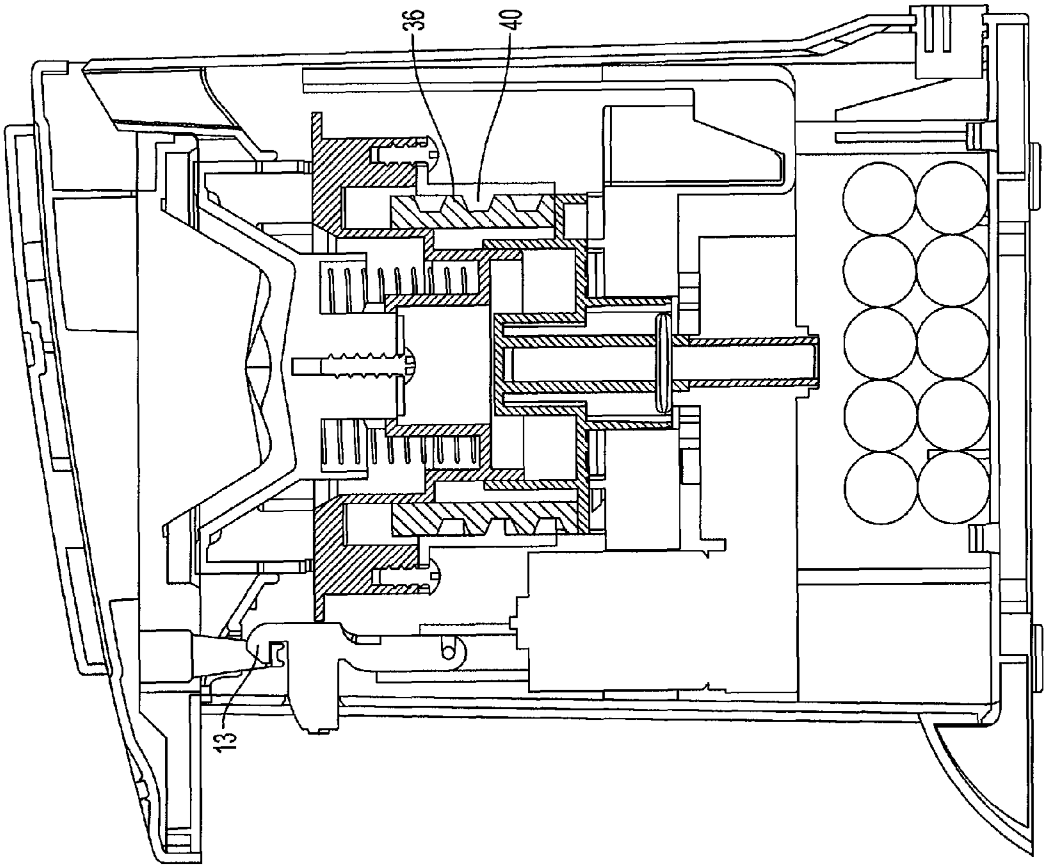

PILL CRUSHER DEVICE AND METHOD

BACKGROUND OF THE INVENTION

The present application relates to pill crusher devices and methods and more particularly relates to a pill crusher apparatus and method for crushing one or more pills between a pair of nesting cups, removing the top cup and mixing the powdered medicine with a liquid or other consumable making it easier for a patient to ingest.

SUMMARY OF THE INVENTION

The invention provides a pill crushing apparatus for use with first and second nestable cups and includes a first stage of operation wherein a first cup holder is moved linearly toward a second cup mounting surface holding a second cup, and a second stage of operation wherein the first cup holder rotates relative to the rotationally fixed second cup. During the first stage of operation, the pills first begin to crush against the linear load being applied thereto, and thereafter grind into a fine powder due to the subsequent rotational force of the first cup against the second cup.

The present invention more particularly provides an apparatus comprising a motorized device having a first cup holder wherein a first cup is placed. The device further includes a lid having a mounting surface for placement of a second cup. The lid is movable between open and closed positions and when in the closed position, the second or top cup nests inside the first or bottom cup. One or more pills are placed in the first cup prior to closing the lid and nesting the cups with the pills located between the first and second cups. The first cup holder is located within a cup holder fixture which itself is located within a rotatable base part having a neck into which a drive shaft extends.

The drive shaft connects to a motor which rotates the drive shaft which imparts rotation to the rotatable base part. The rotatable base part includes a first set of threads on an outer wall thereof which mate with a second set of threads on an inner wall of the cup holder fixture although the inner and outer wall relationship may of course be reversed.

A brake is provided to prevent the cup holder fixture from rotating during a first stage of operation of the motor and drive shaft. During the beginning of the first stage, the first and second nesting cups are spaced apart and no crushing of the pills has yet occurred.

Upon activation of the motor and drive shaft, the rotatable base part begins rotating. Since the brake is applied to the cup holder fixture, the cup holder fixture is prevented from rotating and is instead forced to translate linearly along its threaded connection to the rotatable base part and thereby travels in an upward direction with the bottom cup moving toward the top cup.

A spring may be located between the cup holder and cup holder fixture such that the spring begins to compress as the bottom cup engages the top cup and the cup holder fixture continues to move toward the cup holder. Once the cup holder fixture has moved to its uppermost linear extent, the pills may begin to crush against the linear force. At this time, the brake releases and the cup holder fixture freely rotates with the rotatable base part. This imparts rotational movement to the cup holder fixture and thus also the bottom cup against the stationary top cup and results in grinding of the pills therebetween into a powdered form. The drive shaft then reverses and the cup holder fixture lowers allowing the lid to be opened and the bottom cup with powdered medicine to be removed from the device.

BRIEF DESCRIPTION OF THE DRAWING

FIG. 3 is the view of FIG. 2 showing the cup holder and drive shaft in the half-way up position;

DETAILED DESCRIPTION OF A PREFERRED EMBODIMENT

Figure 1:
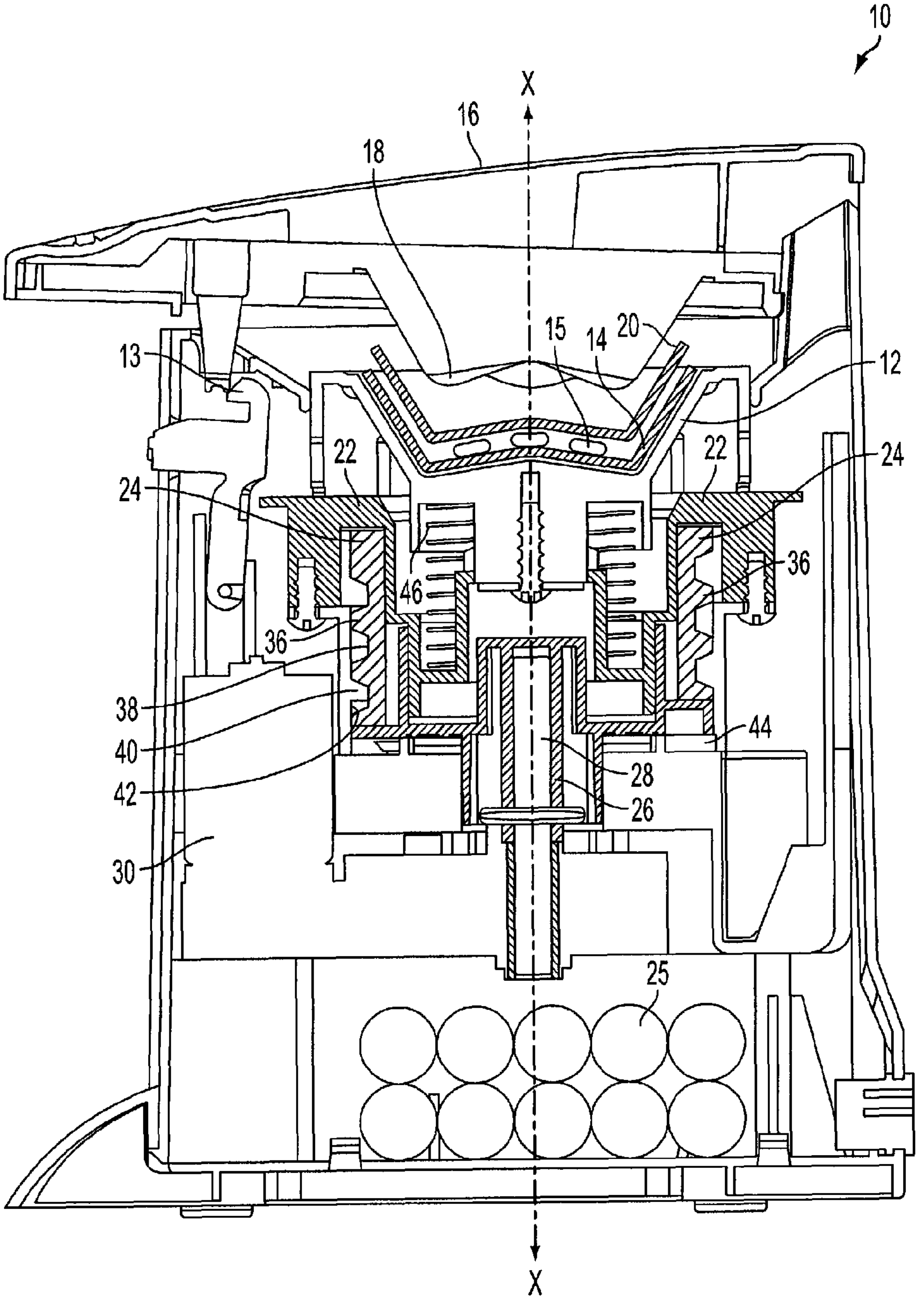
FIG. 1 is a cross sectional view of a pill crusher device according to an embodiment of the present invention with the cup holder and drive shaft in the fully lowered position and the lid in the unlatched position.

The present invention provides an apparatus comprising a motorized device 10 having a first cup holder 12 wherein a first cup 14 is removably placed. Device 10 further includes a lid 16 having a cup mounting surface 18 for receiving a second cup 20. The lid 16 is movable between open and closed, latched positions and when in the closed position, the second or top cup 20 nests inside the first or bottom cup 14. One or more pills 15 are placed in the first cup 14 prior to closing the lid 16 and nesting the cups with the pills located between the first and second cups 14, 20. It is noted cups 14, 20 and pills 15 are shown only in FIG. 1 for the sake of clarity.

The first cup holder 12 is located within a cup holder fixture 22 which itself is located within a rotatable base part 24 having a neck 26 into which a drive shaft 28 extends. When lid 16 is in the closed position, second cup mounting surface 18, first cup holder 12, cup holder fixture 22, and rotatable base part 24 are all in axial alignment along axis X-X seen in FIG. 1.

Figure 5B:
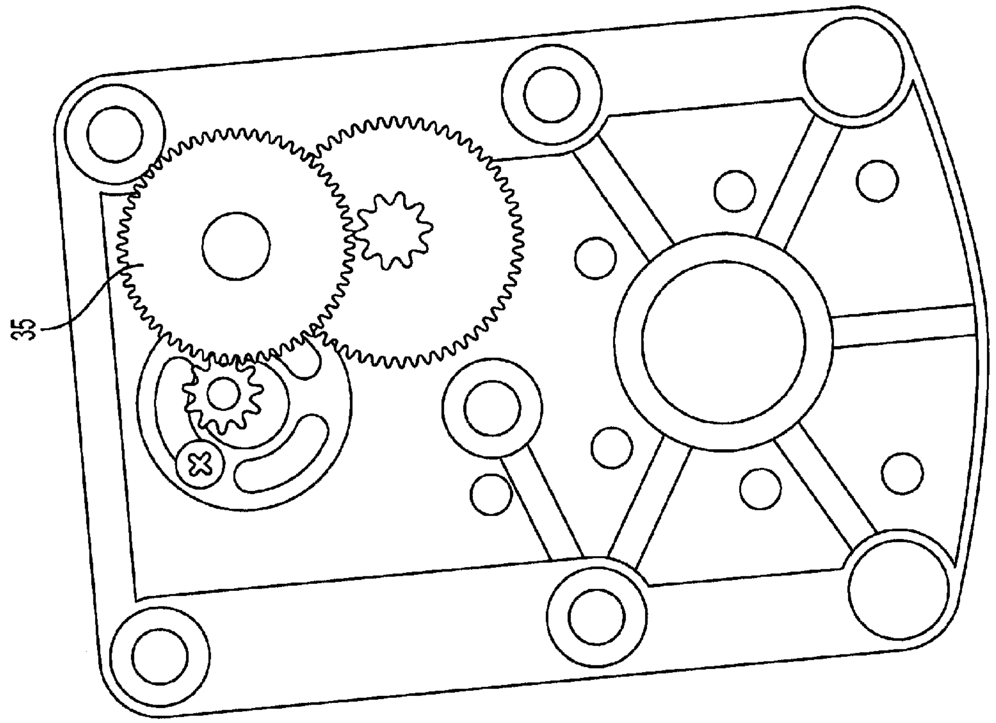
FIGS. 5A and B are plan views showing opposite sides of the gear box.
Figure 5A:
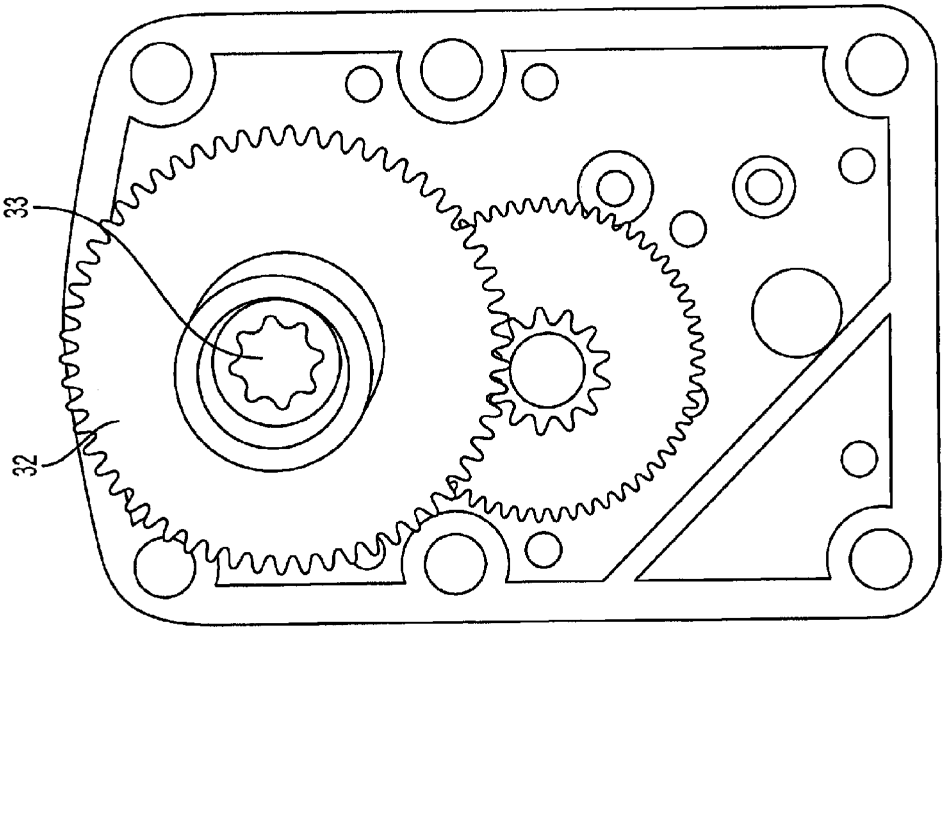
Figure 6B:
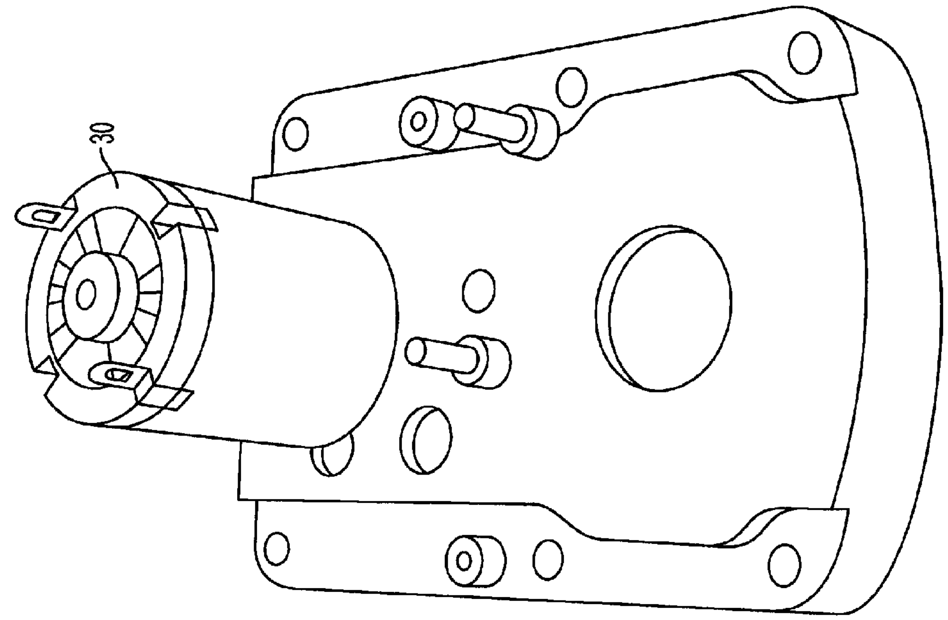
FIGS. 6A and B are perspective views of a part of the gear box and motor and motor mount.
Figure 6A:
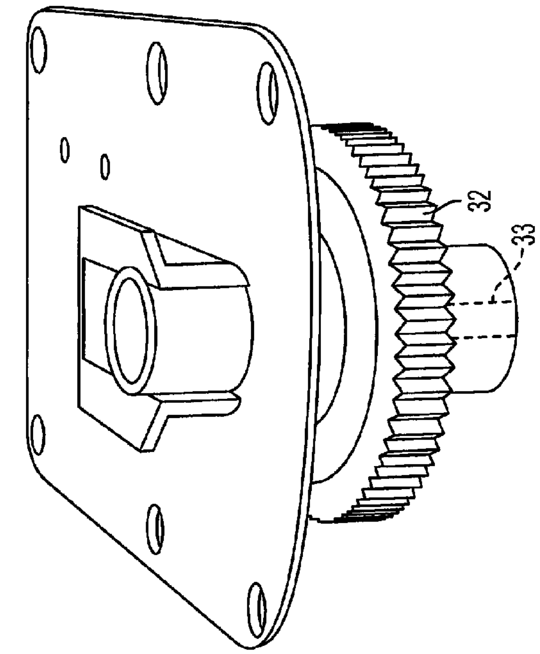

The drive shaft 28 connects to a motor 30 which rotates the drive shaft 28 which imparts rotation to the rotatable base part 24. Motor 30 may be supplied electricity via batteries 25 or an A/C plug 27, for example. The drive shaft 28 is connected to drive gear 32 via aperture 33 and are rotationally fixed together such that rotation of drive gear 32 via meshing gear set 35 and motor 30 impart rotation to drive shaft 28 (see also FIGS. 5 and 6). The rotatable base part 24 includes a first set of threads 36 an outer wall 38 thereof which mate with a second set of threads 40 on an inner wall 42 of the cup holder fixture 22.

Figure 2:
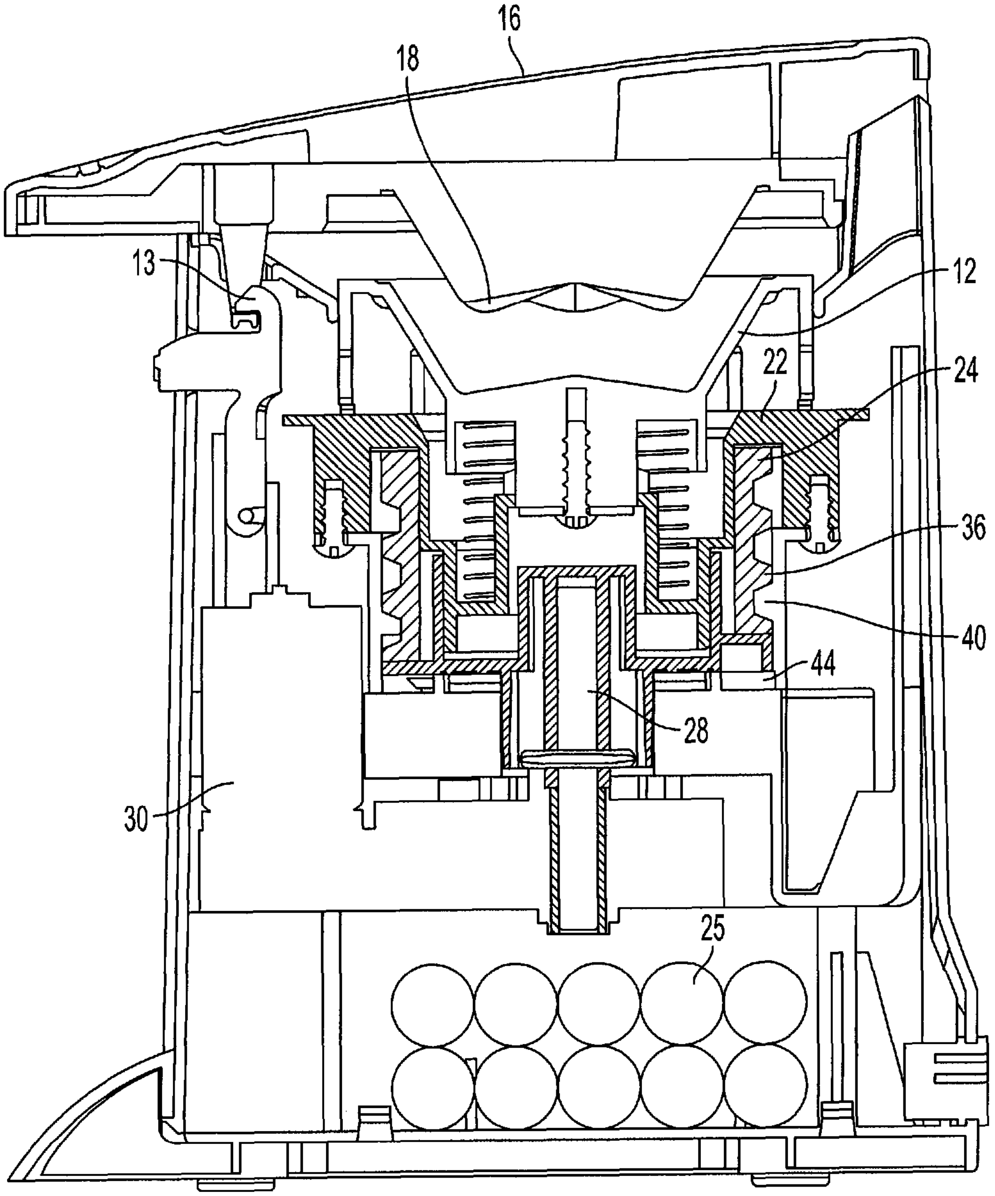
FIG. 2 is the view of FIG. 1 with the lid in the latched position.

A brake 44 is provided to prevent the cup holder fixture 22 from rotating during a first stage of operation of the motor 30 and drive shaft 28. During the beginning of this first stage, the cup holder fixture 22 is in its fully down position (FIGS. 1 and 2) where the first and second nesting cups 14, 20 are spaced apart and no crushing of the pills has yet occurred.

Upon activation of the motor 30 and drive shaft 28, the rotatable base part 24 begins rotating. Since a brake 44 is applied to the cup holder fixture 22, the cup holder fixture 22 is prevented from rotating and is instead forced to translate linearly along its threaded connection to rotatable base part 24 and thereby travels in an upward direction with the bottom cup 14 moving toward the top cup 20.

Figure 4:
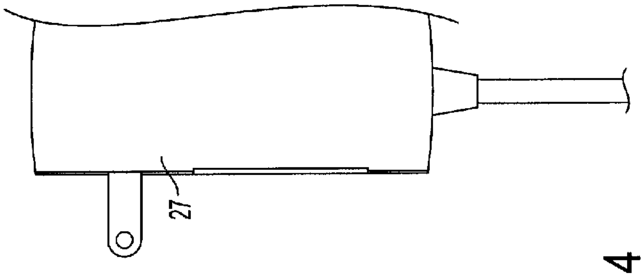
FIG. 4 is the view of FIG. 3 showing the cup holder and drive shaft in the fully raised position.
Figure 4:
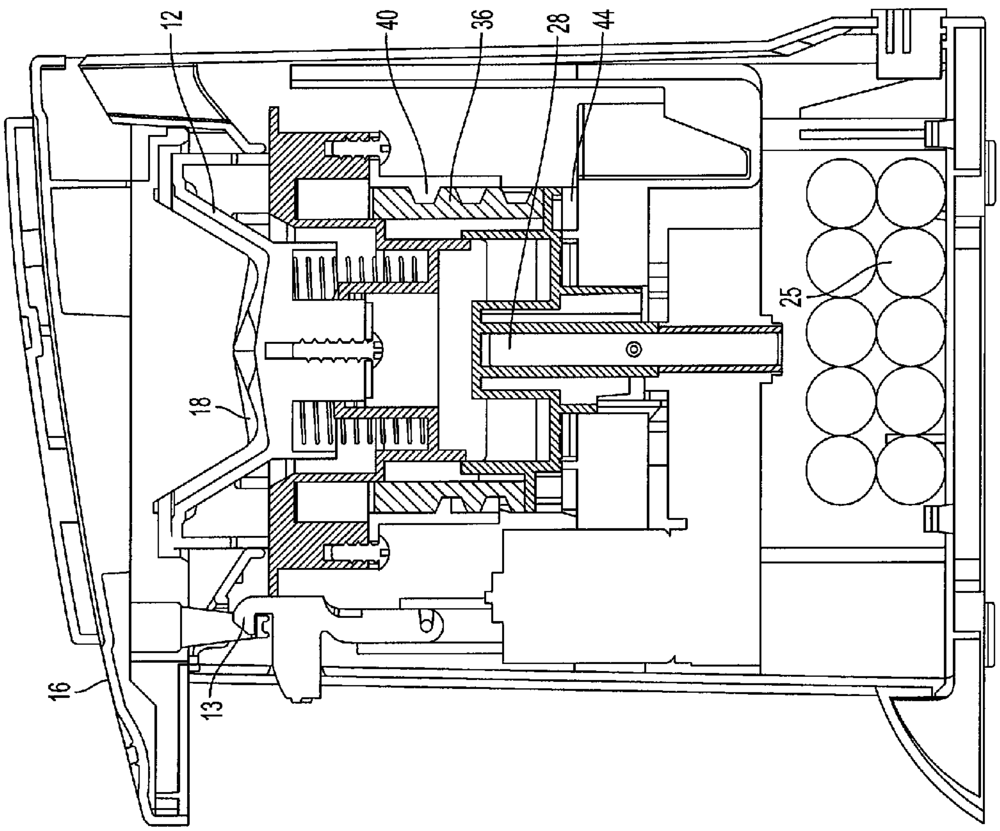

A spring 46 may be located between the cup holder 12 and cup holder fixture 22 such that the spring 46 begins to compress as the bottom cup 14 engages the top cup 20 and the cup holder fixture 22 continues to move toward the cup holder 12. Once cup holder fixture 22 has moved to its upper-most linear extent (FIG. 4), the pills may start crushing due to the linear load applied thereto. At this time, brake 44 is released and the cup holder fixture 22 will freely rotate with the drive shaft 28. This imparts rotational movement to the cup holder 12 and bottom cup 14 against the stationary top cup 20 and results in grinding of the pills therebetween into a powdered form. The drive shaft 28 then reverses and the cup holder 12 lowers allowing the latch 13 to be released, lid 16 opened and the bottom cup 14 with powdered medicine removed from the device 10. The powdered medicine may then be mixed with a liquid for easier consumption by a patient.

What is claimed is:

1. Pill crushing apparatus for use with first and second nestable cups, said apparatus comprising:

a) a first cup holder configured to removably hold said first cup;

b) a cup holder fixture axially aligned with said first cup holder, said cup holder fixture including a first set of threads;

c) a rotatable base part axially aligned with said cup holder fixture opposite said first cup holder, said rotatable base part including a second set of threads which mesh with said first set of threads on said cup holder fixture such that said cup holder fixture and said rotatable base part may translate linearly with respect to each other;

d) a second cup mounting surface axially alignable with said first cup holder opposite said cup holder fixture and configured to releasably engage said second cup; and e) a brake releasably connected to said cup holder fixture, said brake operable between an engaged position wherein said cup holder fixture cannot rotate and is thereby forced to translate linearly along said rotatable base part when said rotatable base part is rotating, and a released position wherein said cup holder fixture may rotate with said rotatable base part;

whereby, upon rotation of said rotatable base part and when said brake is in said engaged position, said cup holder fixture translates linearly along said rotatable base part toward said first cup holder moving said first cup holder into engagement with said second cup mounting surface and causing said brake to move to said released position and thereby allowing said cup holder fixture to rotate with respect to said second cup mounting surface and thereby imparting a grinding force against pills held between said first and second cups.

2. The apparatus of claim 1 and further comprising a spring between said cup holder fixture and said first cup holder, said spring becoming gradually compressed as said cup holder fixture moves toward and engages said cup holder.

3. The apparatus of claim 1 and further comprising a drive shaft connected to and operable to rotate said rotatable base part.

4. The apparatus of claim 1 and further comprising a housing and a lid movable between an open and closed position with respect to said housing, said second cup mounting surface located on said lid and axially aligned with said first cup holder when said lid is in said closed position.

* * * * *